US006364767B1

(12) United States Patent
Brossard et al.

(10) Patent No.: US 6,364,767 B1
(45) Date of Patent: Apr. 2, 2002

(54) COMBINATION SELECTION AND DISPLAY METHOD AND APPARATUS FOR A GAMING TERMINAL

(75) Inventors: Jean Brossard, Reno; Dennis Mead, Carson City, both of NV (US)

(73) Assignee: International Game Technology, Reno, NV (US)

( * ) Notice: Subject to any disclaimer, the term of this patent is extended or adjusted under 35 U.S.C. 154(b) by 0 days.

(21) Appl. No.: 09/492,722

(22) Filed: Jan. 27, 2000

(51) Int. Cl.[7] ................................................ A63F 13/00
(52) U.S. Cl. .............................. 463/20; 463/22; 463/25
(58) Field of Search ........................... 463/9, 10, 16–25

(56) References Cited

U.S. PATENT DOCUMENTS

| | | | | |
|---|---|---|---|---|
| 4,695,053 A | * | 9/1987 | Vazquez et al. | 273/143 R |
| 5,159,098 A | * | 10/1992 | Slomiany et al. | 463/25 |
| 5,401,024 A | * | 3/1995 | Simunek | 463/17 |
| 6,059,658 A | * | 5/2000 | Mangano et al. | 463/16 |
| 6,089,976 A | * | 7/2000 | Schneider et al. | 463/16 |
| 6,105,962 A | * | 8/2000 | Malavazos et al. | 463/20 |
| 6,117,009 A | * | 9/2000 | Yoseloff | 463/20 |
| 6,168,523 B1 | * | 1/2001 | Piechowiak et al. | 463/26 |
| 6,174,234 B1 | * | 1/2001 | Seibert et al. | 463/20 |
| 6,190,255 B1 | * | 2/2001 | Thomas et al. | 463/20 |
| 6,203,428 B1 | * | 3/2001 | Giobbi et al. | 463/16 |
| 6,203,429 B1 | * | 3/2001 | Demar et al. | 463/20 |
| 6,231,442 B1 | * | 5/2001 | Mayerhoff | 463/20 |

* cited by examiner

*Primary Examiner*—Jessica J. Harrison
*Assistant Examiner*—John M. Hotaling
(74) *Attorney, Agent, or Firm*—George H. Gerstman; Seyfarth Shaw

(57) ABSTRACT

An electronic gaming terminal includes a game portion which allows a user to select one component from among a plurality of components, in each of a plurality of categories. Preferably, at least one category relates to an entertainment component such a selecting a song, video or the like, and/or selecting an artist, performer and the like. A bonus prize is awarded in an amount correlating with the degree of correspondence with the selections made by the user and a final, preferably randomly selected, combination. In one aspect, one prize is awarded if a player correctly guessed only the artist and a higher prize or bonus is awarded if the player selected correctly both the artist and the song. In one embodiment, the player's selected song is performed during at least a portion of the bonus procedure.

18 Claims, 4 Drawing Sheets

COMBINATION SELECTION AND DISPLAY METHOD AND APPARATUS FOR A GAMING TERMINAL

The present invention relates to a gaming terminal which includes, as a portion of its operation, an ability to guess a combination among a plurality of components, which is later displayed, and in particular, to a gaming apparatus in which such combination may be a combination of songs and performing artists or other items with the size of the bonus being related to correspondence between the player's guess and a displayed combination.

BACKGROUND INFORMATION

An important aspect of the attractiveness of gaming terminals to players (which can determine the profitability of a gaming terminal to a casino or other game operator) can include the theme of a gaming terminal. The theme can be included as some or all of the main game but is often included as at least part of a bonus aspect of the game (i.e., a feature of the game that is implemented following play of a main game, and typically without requiring an additional wager for the bonus feature).

Among themes which have proved relatively attractive to players have been themes related to entertainment, especially themes based on a singer or based on another artist. For example, as described in U.S. patent application No. 09/166,483, filed Oct. 5, 1998, incorporated herein by reference, a gaming terminal can have a theme based on, for example, Elvis Presley or another musical artist. However, it is believed that there is a potential for creating even greater interest (and/or interesting additional segments of the population) by providing gaming terminals which have a theme including two or more artists. Accordingly, it would be useful to provide a gaming terminal configured to accommodate a theme, especially a bonusing theme, relating to multiple different artists.

Certain types of bonus features are substantially passive, from the players point of view, such as requiring substantially no input or interaction by the player. Others require only a minimal input such as activating a single start button or other initiation control. In other instances, more interactive bonusing features are provided. Examples are described, e.g. in U.S. patent applications No. 60/153,725 (Attorney File No. 3735-933), and 60/153,746 (Attorney File No. 3735-931), incorporated herein by reference. Although interactive bonus features are believed to provide a number of benefits, it is believed that there is potential for interesting additional segments of the population by providing different types of interactive bonusing. Accordingly, it would be useful to provide interactive bonusing features different from those previously implemented, especially for attracting additional segments of the population.

SUMMARY OF THE INVENTION

According to one aspect of the invention, an interactive bonusing feature is provided which provides two or more different categories of objects, with two or more components in each category. The player is permitted or prompted to select a combination of components by selecting, e.g., one component from each category. A final combination is selected, preferably either randomly selected or having the appearance of random selection (such as by displaying counter rotating, indicia-bearing rings with the final combination indicated by a pointer or the like). The prize which the player receives as a bonus (if any) is determined by, or indicated by, the degree of correspondence between the selected combination and the final combination. In one embodiment some or all of the categories relate to a song, video or other entertainment segment. For example, categories can include song title, song artists and the like. Accordingly, in one embodiment, players select an artist, from a plurality of different artists, select a song, from a plurality of different songs by that artist, and, potentially, another category such as a color. The components of the various categories are displayed in various combinations such as by displaying counter-rotating rings with artist indicia on one ring, song indicia on another ring and the like. In one embodiment, the song selected by the player plays during such display. When the counter-rotating motion of the rings stops, the artist and song (and/or other category, if any) combination which represents the final bonus combination is displayed, e.g., by a pointer, back lights and the like. In this embodiment, the player receives different prizes depending on whether the player selected the "correct" artist, song, and color, or selected two or more correct components of the final combination.

In one aspect, an electronic gaming terminal includes a game portion which allows a user to select one component from among a plurality of components in each of a plurality of categories. Preferably at least one category relates to an entertainment component such as selecting a song, video or the like, and/or selecting an artist, performer and the like. A bonus prize is awarded in an amount correlating with the degree of correspondence with the selections made by the user and a final, preferably randomly selected, combination. In one aspect, one prize is awarded if a player correctly guessed only the artist and a higher prize or bonus is awarded if the player selected correctly both the artist and the song. In one embodiment, the player's selected songs performed during at least a portion of the bonus procedure.

DETAILED DESCRIPTION OF THE PREFERRED EMBODIMENT

Figure 1:
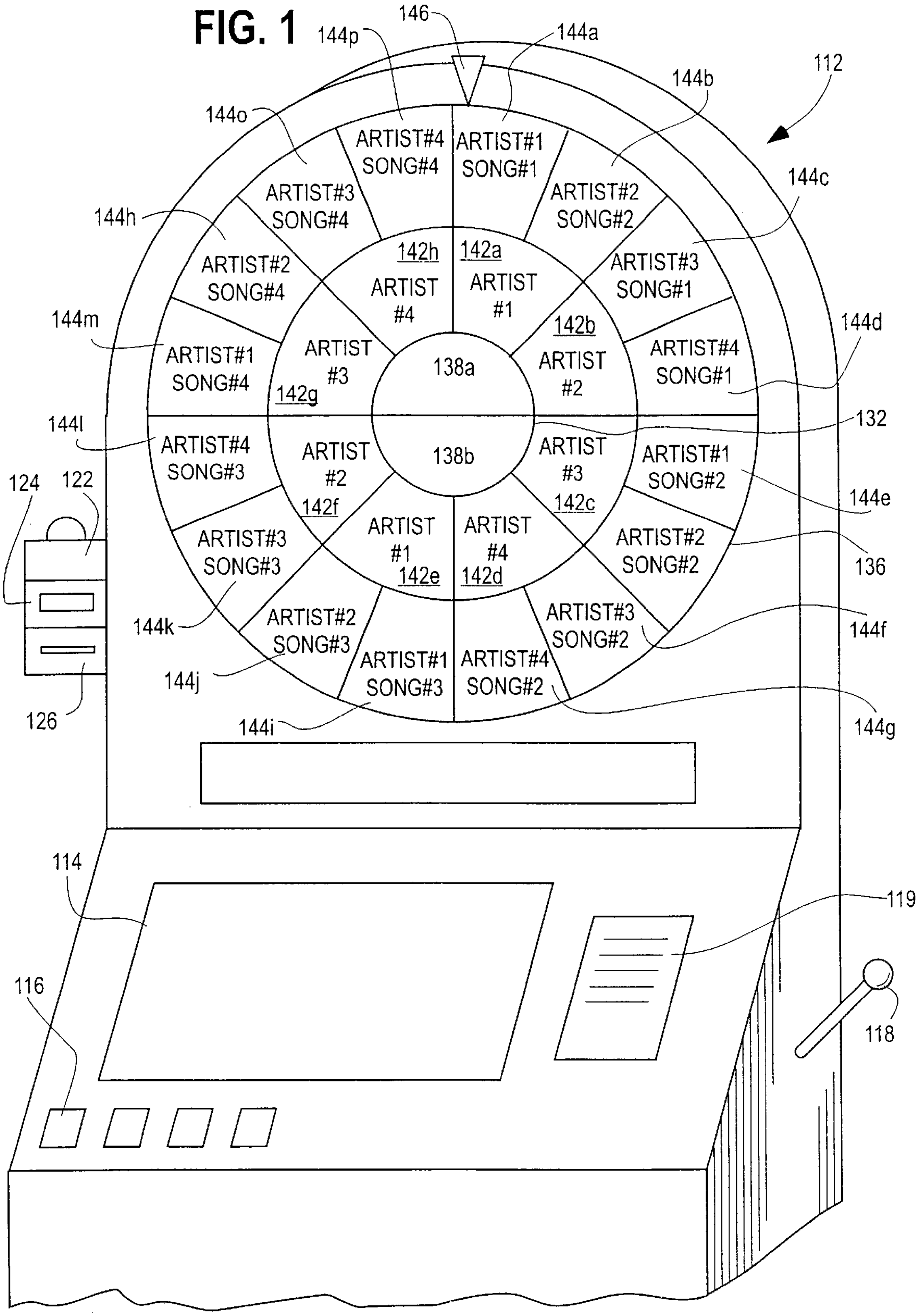
FIG. 1 is simplified perspective view of a gaming terminal of a type which can be used according to one embodiment of the present invention.

Although the present invention can be used in connection with many different configurations of gaming terminals, in one embodiment, as illustrated schematically in FIG. 1, a gaming terminal 112 includes a main game portion providing a main game display such as a computer control video display, e.g., a liquid crystal display (LCD), which may, if desired, be a touch screen LCD 114, a cathode ray tube (CRT) and the like, or a physical game display such as slot machine physical reels and the like. Those of skill in the art will understand how to provide control of a display 114 for playing a main game such as a physical or simulated slot machine game, a simulated card game, a keno game and the like. Various components may be provided for player input. In addition to, or in place of, a touch screen 114, the gaming terminal may include buttons 116, a pull handle 118 and the like. Preferably, indicia 119 provide decoration, advertising and/or instructions, prize amounts, and the like. Wagers may be placed, e.g., via credit card or other card acceptor 126, cash, coin or token acceptors, etc.

Figure 2:
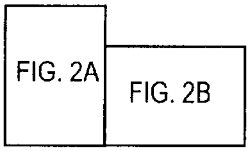
FIG. 2 is a flow chart depicting a gaming procedure according to one embodiment of the present invention.
Figure 2A:
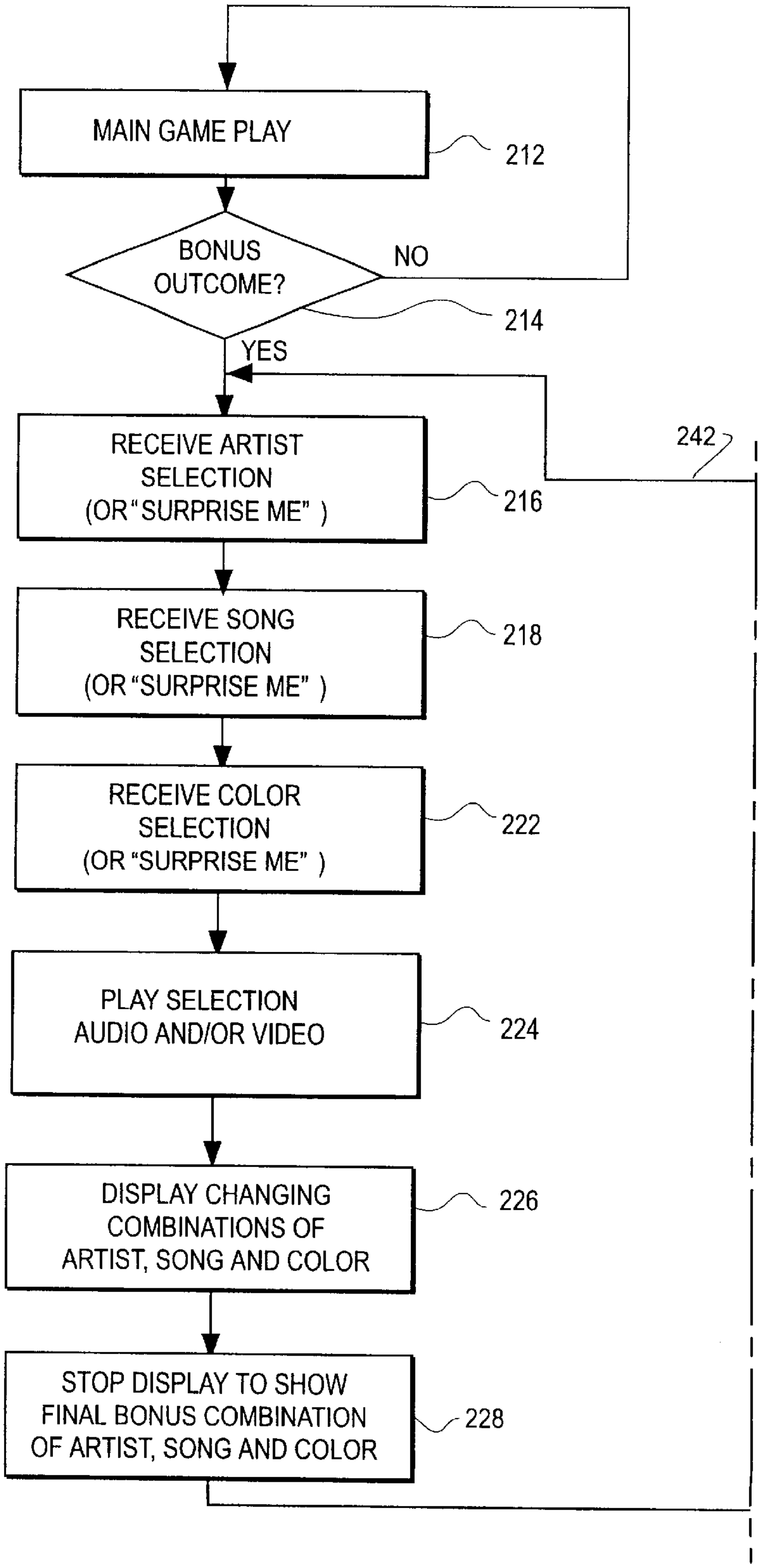
Figure 2B:
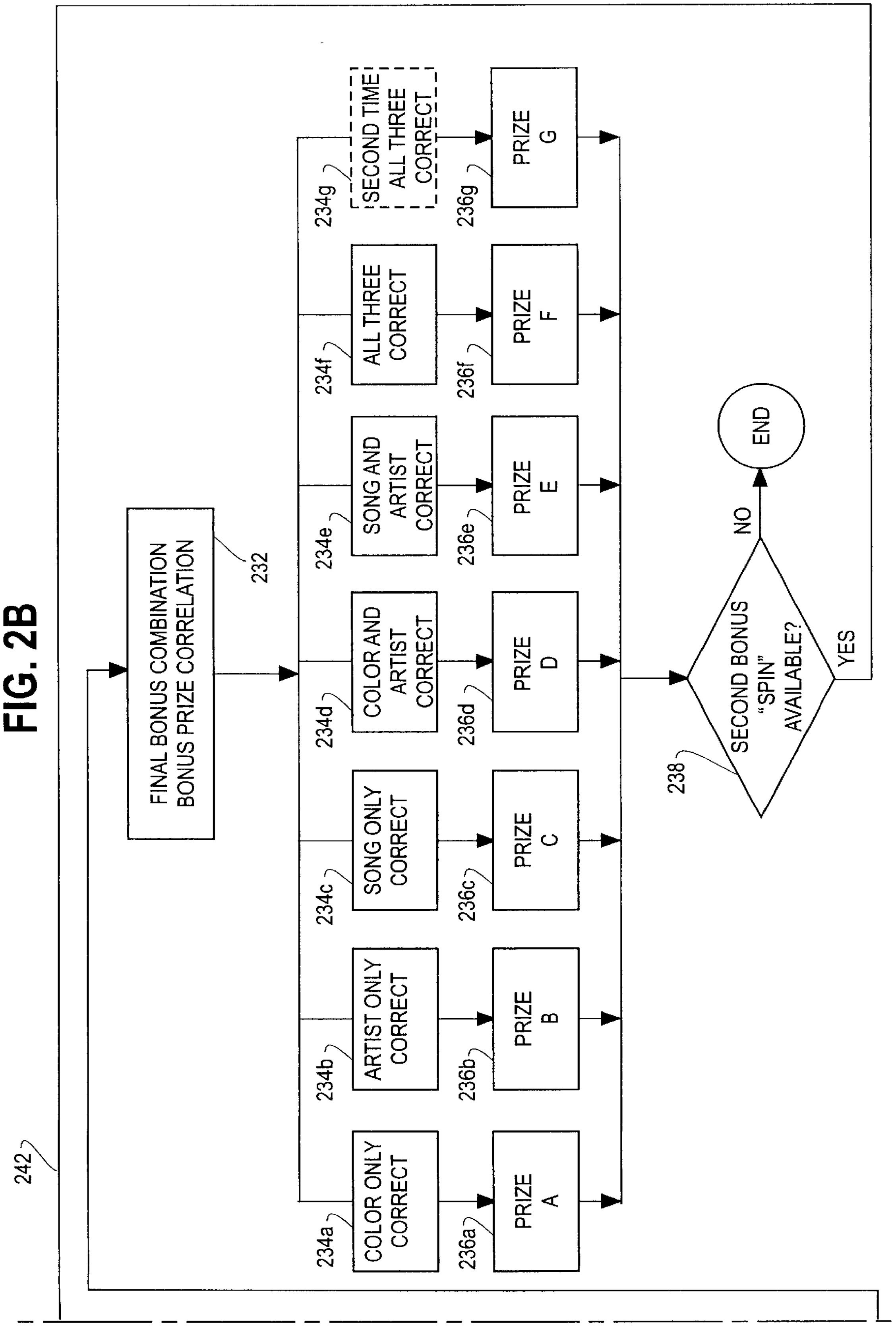
Figure 3:
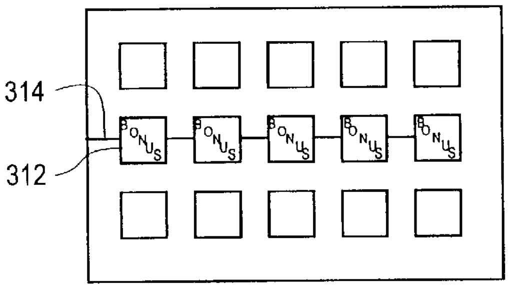
FIG. 3 is an illustration of a main game display screen indicating a bonus feature.

As depicted in FIG. 2, a player can play the main game 212 in substantially a traditional fashion with each round of the main game being evaluated for a bonus outcome 214. Many different types of game outcomes can be defined as a bonus outcome. As one example, in the illustration of FIG. 3, a five (simulated) reel slot machine is configured such that a bonus outcome occurs when a "bonus" symbol 312 appears on each of the five reels along the (central) pay line 314. If desired, the occurrence (or type) of bonus can be conditioned on the amount of the wager placed (e.g., the number of coins bet).

Figure 4:
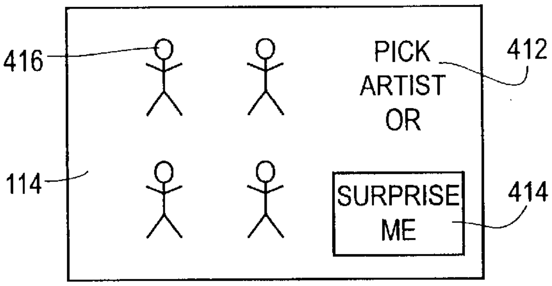
FIG. 4 is an illustration of a gaming terminal display, displaying an artist selection screen.
Figure 5:
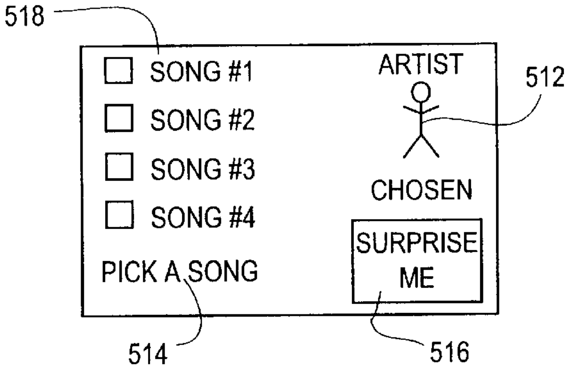
FIG. 5 is an illustration of a gaming terminal display, displaying a song selection screen.
Figure 6:
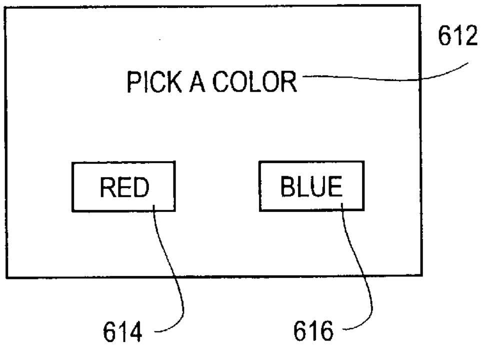
FIG. 6 is an illustration of a gaming terminal display, displaying a color selection screen.
Figure 7:
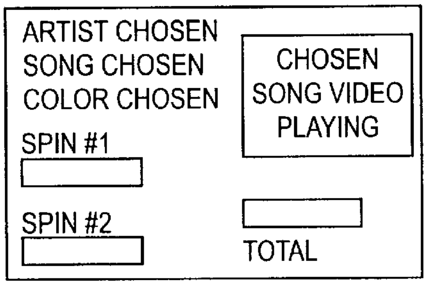
FIG. 7 is an illustration of a gaming terminal display, displaying a results screen.

In response to the occurrence of a bonus outcome 214, the gaming terminal will prompt for selection of a component in a first category. FIG. 4 illustrates a selection screen in which the first category is a musical artist, containing a prompt asking the player to select one of the artists 412 or, alternatively, to request that the computer select one of the artists (preferably randomly), i.e., to "surprise" the player 414. In the illustration of FIG. 4, pictures or other indicia for each artist 416 are displayed and preferably the player can select a desired artist by touching the area of the touch screen 114 corresponding to the desired artist. After the gaming terminal receives the selection 216 (or makes a selection in response to the "surprise me" request) the gaming terminal displays a request or prompt to select a component in a second category. As illustrated in FIG. 5, in one embodiment, the second category is a song recorded by the musical artist who was previously selected 216. In the illustration of FIG. 5, the previously selected artist is displayed 512 and the player is prompted 514 to either select a song or to allow the terminal to select a song 516. In the illustrated embodiment, the potential song titles are displayed 518 and the player may select one of the song titles by touching a region of the touch screen corresponding to the display title. Following the receiving of a song selection 218 (or a selection made by the gaming terminal) the display prompts the player to select a component of a third category, in the illustration of FIG. 6, to select a color 612, e.g., by touching an area of the touch screen 614, 616 corresponding to the selected color. After receiving the color selection 222 (or allowing the computer to make the selection), preferably the gaming terminal will play the selected audio song, or a video corresponding to the selected song 224, preferably at the same time as displaying changing combinations of artist, song and color 226. In the embodiment illustrated in FIG. 1, the changing combinations are displayed by way of three counter-rotating rings 132, 134, 136. Each ring 132, 134, 136 contains indicia of the components of one of the categories. For example, the inner ring 132 contains red and blue regions 138*a* 138*b*. The next ring 134 contains indicia 142*a*–142*h* corresponding to the artists. The outermost ring 136 contains indicia 144*a*–144*p* of the various songs that could be selected, from among the song category. At any one time, a selected combination of artist, song and color is indicated by a pointer 146. For example, in the condition illustrated in FIG. 1, the pointer 146 indicates the combination of song number 1, artist number 1 and the color red 138*a*. This combination will change as the rings 132, 134, 136 counter-rotate.

Other manners of displaying combinations of category components can be used. For example, rather than providing counter-rotating physical rings, the various display regions, e.g., as illustrated in FIG. 1 can, instead, be selectably illuminateable (e.g. backlit) either in a sequential manner (to simulate rotational movement), or in a random manner. In another embodiment, rectangular arrays of various components or combinations can be selectably highlighted such as being selectably backlit, and the like. Those of skill in the art will understand fashions of displaying combinations, after understanding the present disclosure.

At some point (e.g. after a random or predetermined delay), the changing display (226) is stopped 228 to show a final bonus combination of artist, color and song. In the embodiment of FIG. 1, the final combination will be whatever combination of artist, color and song is pointed to by the pointer 146 at the time the changing display stops, i.e., at the time the counter-rotating rings stop rotating. In one embodiment, the final combination for the bonus feature is not determined until the changing display 226 is initiated. In another embodiment, the final bonus combination is predetermined and the changing display is controlled in a fashion such that, when the change in display stops, the predetermined final combination will be displayed or indicated.

In one embodiment, the final combination is randomly selected from among all possible combinations, e.g., such that all possible combinations have an equal probability of occurring. In another embodiment, some combinations have a higher probability of occurring than others, such as by providing a weighted pseudo-random selection and/or by selecting from a table having some or all possible combinations repeated (i.e. a weighted or virtual display). In some embodiments, the amount of the bonus prize and/or the final combination (or the type of final combination such as "correct artist only") is predetermined, such as being determined as a function of the type of main game play outcome 212, the type of bonus being played and the like. Those of skill in the art will understand other fashions of determining or predetermining the final bonus combination 228.

When the final bonus combination is displayed, the prize provided as this portion of the bonus feature can be shown to the player. In one embodiment, the final combination is randomly selected after the changing display is initiated 226, e.g. such that it is the changing display 226 and (preferably randomly selected) stop time 228 which determine the amount of the prize. In another embodiment the final combination has been predetermined and the display 226 and stop 228 act substantially only as a way of displaying or illustrating the predetermined results of the bonus feature in an interesting fashion (preferably providing an illusion of random selection or other non-predetermination). In either case, preferably the correlation between the selections made by the player 216, 218, 222 and the final combination 228 are indicative of (and, in some embodiments, determine) a prize amount 232. In the illustration of FIG. 2, a plurality of different prizes 236*a*–236*g* are associated with various degrees of player success in "predicting" the result, i.e. different prizes are provided depending on whether the player, in the initial selection 216, 218, 222, selected only the correct color 234*a*, only the correct artist 236*a*, 234*b*, only the correct song 234*c*, both the correct color and the correct artist 234*d*, the correct song and artist 234*e*, or the correct song, artist and color 234*f*.

In some embodiments, some or all of the bonus features or bonus rounds may involve two or more spins or chances.

Figure 8:
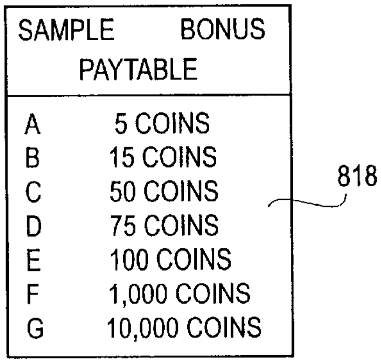
FIG. 8 is an illustration of a bonus pay table according one example of an embodiment of the present invention.

Thus, in the illustration of FIG. 2, if another spin is available 238 the procedure returns 242 to permit the player to select an artist, song and color again and/or to receive another final combination for evaluation. In one embodiment, there is an additional prize 236*g* awarded when the player selects all three items correctly in both spins 234*g*. The size of the prizes 236*a–g* will depend upon the type of game being played, the odds of the game, and other similar factors. Many types of prize structures are available. FIG. 8 provides an example of one possible prize structure 818, although those of skill in the art will understand that many possible prize structures can be provided.

In light of the above description, a number of advantages of the present invention can be seen. The present invention can provide a practical fashion for increasing player interest by providing a theme which is associated with multiple different persons, characters and/or musical or other artists. The present invention preferably provides a degree of player interaction in the bonus feature of the game such as by allowing the player to guess or predict a final combination from among a plurality of categories. Although it is possible to provide games with many different types of categories or themes, it is believed the present invention is particularly useful in that it can be readily associated with unique attractiveness of musical or other performance artists and can provide for an audio output and/or video display of a performance as part of, or during a part of, a bonus feature.

A number of variations and modifications of the invention can be used. It is possible to use some features of the invention without using others. For example, it is possible to provide a bonus feature in which a player predicts or guesses a combination, including selecting among a plurality of different musical artists, without providing for a display that involves counter-rotating physical rings. Although embodiments of the present invention have been described in connection with a gaming terminal bonus feature, it is possible to provide gaming terminals in which some or all aspects of the present invention are incorporated into the main game. Although embodiments of the present invention have been described illustrating songs as an example of entertainment segment components, other entertainment segments can be used such as segments of comedy routines, dance routines, movies or other videos, magic shows, athletic events, and the like. Although examples have been provided in which some or all of the categories or category components relate to entertainment items, other items can be used including, for example, factual items, such as so-called trivia questions including historical, scientific, popular culture, biographical or other facts or questions and the like. Although an example has been provided in which a player selects from three categories, it is possible to provide embodiments in which more or fewer categories are used (preferably coordinated with prize amounts such that probabilities of winning various prizes are within desired boundaries. In some embodiments there may be two or more different types of bonuses (e.g., first bonus associated with a first game outcome, a second bonus associated with a second game outcome, and the like) with the number or type of categories being affected by the type of bonus. Although embodiments were illustrated in which the player selects a single item from each category, it is also possible to provide embodiments in which a player may select two or more items from some or all categories.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g. for improving performance, achieving ease and/or reducing cost of implementation. The present invention includes items which are novel, and terminology adapted from previous and/or analogous technologies, for convenience in describing novel items or processes, do not necessarily retain all aspects of conventional usage of such terminology.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. An electronic gaming terminal for playing at least a first game by a user in response to placing of a wager, said game providing a first prize during normal game play and initiating at least a first bonus round in response to a bonus game outcome, the terminal comprising:

a first input device which receives input from said user, defining at least a first bonus round outcome as a first user-selected outcome; and a display which displays at least one displayed bonus round outcome including a plurality of components from each of a plurality of categories wherein a first bonus prize is awarded if said display bonus round outcome at least partially matches a second user-selected outcome which comprises a combination of at least one component from each of said categories.

2. A gaming terminal, as claimed in claim 1, wherein said first input device comprises a touchscreen.

3. A gaming terminal, as claimed in claim 1, wherein said plurality of components includes sub-components selected from each of a plurality of sub-categories and wherein said second user-selected outcome comprises a combination of at least one of said sub-components selected from a sub-category.

4. A gaming terminal, as claimed in 1, wherein at least one of said categories comprises a plurality of musical performances.

5. A method of playing a wagering game comprising:

providing an electronic gaming terminal for playing at least a first game in response to placing of a wager, said game providing a first prize during normal game play;

initiating at least a first bonus round in response to a bonus game outcome of said normal game play;

receiving input from a user indicating a selection from among a plurality of displayed components, defining at least a first bonus round outcome as a user-selected outcome;

displaying at least one displayed bonus round outcome; and awarding a first bonus prize if said displayed bonus round outcome at least partially matches said user-selected outcome.

6. A method, as claimed in claim 5, wherein said step of defining includes defining at least first and second components of first and second categories.

7. A method, as claimed in claim 6, wherein said bonus round outcome partially matches said user-selected outcome if at least one component of said displayed bonus round outcome matches at least one of said first and second components.

8. A method, as claimed in claim 6, wherein at least one of said categories comprises a musical performance.

9. A method, as claimed in claim 6, wherein one of said categories comprises a musical artist.

10. A method, as claimed in claim 5, wherein said step of receiving input comprises receiving input indicating a selection from among a plurality of displayed categories.

11. A method, as claimed in claim 5, wherein a size of said first bonus prize is related to a size of said wager.

12. A method, as claimed in claim 5, wherein a size of said first bonus prize is related to a measure of a number of components of said user-selected outcome which match components of said displayed bonus round outcome.

13. A method, as claimed in claim 5, further comprising:

receiving a second set of input from said user defining at least a second bonus round outcome as a second user-selected outcome;

displaying at least a second displayed bonus round outcome; and awarding a second bonus prize if said second displayed bonus round outcome at least partially matches said second user-selected outcome.

14. Gaming apparatus, comprising:

terminal means for playing at least a first main game by a user in response to user input, said main game providing a first prize during normal game play and for initiating at least a first bonus round;

means for receiving input from said user defining at least a first bonus round user-selected outcome;

means for displaying at least one displayed bonus round outcome wherein the display includes a plurality of components from each of a plurality of categories comprising at least one category of musical performances; and computer means for awarding a first bonus prize if said displayed bonus round outcome at least partially matches said first bonus round user-selected outcome.

15. Apparatus as claimed in claim 14 wherein said means for receiving comprises a touchscreen.

16. Apparatus as claimed in claim 14 wherein said means for displaying displays a plurality of components from said each of a plurality of components from said each of a plurality of categories and wherein said user-selected outcome comprises a combination of at least one component from each of said categories.

17. Apparatus as claimed in claim 16 wherein at least one of said categories comprises a plurality of artists names.

18. The apparatus of claim 14 further comprising an audio output component for transmission of a song according to said first bonus round user-selected outcome.

* * * * *